United States Patent
Bergano et al.

[11] Patent Number: 5,440,659
[45] Date of Patent: Aug. 8, 1995

[54] METHOD FOR FABRICATING A FIBER OPTIC CABLE HAVING IMPROVED POLARIZATION MODE DISPERSION (PMD) PERFORMANCE

[75] Inventors: Neal S. Bergano, Lincroft; Kwang S. Kim, Red Bank, both of N.J.

[73] Assignee: AT&T Corp., Murray Hill, N.J.

[21] Appl. No.: 130,037

[22] Filed: Sep. 30, 1993

[51] Int. Cl.$^6$ ................................................. G02B 6/44
[52] U.S. Cl. ..................................... 385/100; 57/229; 57/314; 385/103; 264/1.28
[58] Field of Search ................. 57/3, 6, 7, 13, 59, 57/229, 210, 232, 234, 297; 385/100-114; 264/1.5

[56] References Cited

U.S. PATENT DOCUMENTS

| | | | |
|---|---|---|---|
| 4,154,049 | 5/1979 | King et al. | 385/100 |
| 4,205,899 | 6/1980 | King et al. | 385/100 |
| 4,248,035 | 2/1981 | Skillen et al. | 385/100 |
| 4,484,963 | 11/1984 | Anctil et al. | 156/36 |
| 4,541,970 | 9/1985 | Caverly, Jr. et al. | 264/1.5 |
| 4,757,675 | 7/1988 | Oglesby et al. | 57/6 |
| 4,902,097 | 2/1990 | Worthington et al. | 385/103 |
| 4,993,804 | 2/1991 | Mayr et al. | 385/103 |
| 5,136,673 | 8/1992 | Yoshizawa et al. | 385/103 |
| 5,291,573 | 3/1994 | Yoshida et al. | 385/103 |

OTHER PUBLICATIONS

Sakai et al., The Transactions of the IECE of Japan, vol. E68, No. 1, Jan. 1985, "Polarization Characteristics in Twisted Single-Mode Optical Fibers", pp. 7-13.

Sakai et al., IEEE Journal of Quantum Electronics, vol. QE-17, No. 6, Jun. 1981, "Birefringence and Polarization Characteristics of Single-Mode Optical Fibers under Elastic Deformations", pp. 1041-1051.

Ulrich et al., Applied Optics, 1 Jul. 1979, vol. 18, No. 13, "Polarization optics of twisted single-mode fibers", pp. 2241-2251.

*Primary Examiner*—Rodney B. Bovernick
*Assistant Examiner*—John Ngo
*Attorney, Agent, or Firm*—Mark K. Young; Gregory C. Ranieri

[57] ABSTRACT

Improved PMD performance is achieved in fiber optic cable fabricated in accordance with the principles of the invention by twisting each of a plurality of optical fibers in a controlled manner as the cable is being formed. A controlled amount of twist is imparted to each optical fiber uniformly along its entire length. Uniformity of twist reduces twist-induced strain and promotes optimum PMD reduction.

12 Claims, 3 Drawing Sheets

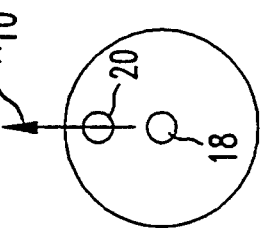
FIG. 13 PRIOR ART
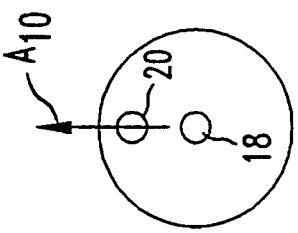
FIG. 12 PRIOR ART
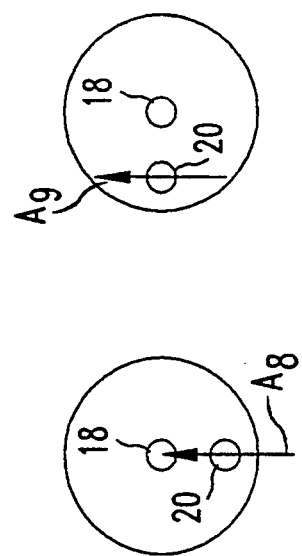
FIG. 11 PRIOR ART
FIG. 10. PRIOR ART
FIG. 9 PRIOR ART
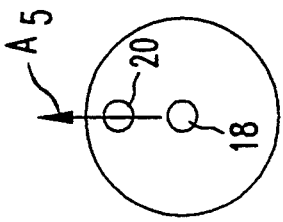
FIG. 8
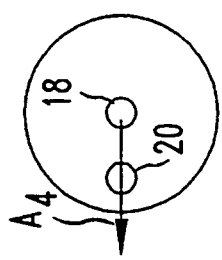
FIG. 7
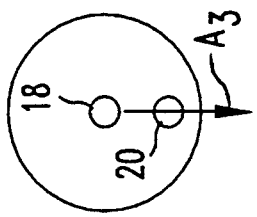
FIG. 6
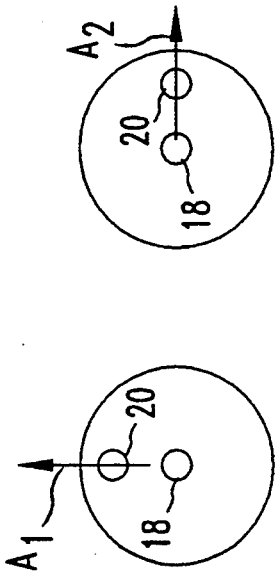
FIG. 5
FIG. 4

METHOD FOR FABRICATING A FIBER OPTIC CABLE HAVING IMPROVED POLARIZATION MODE DISPERSION (PMD) PERFORMANCE

TECHNICAL FIELD

This invention relates to the optical transmission of information and, more particularly, to a method for fabricating a fiber optic cable having improved polarization mode dispersion performance to reduce signal degradation in long distance optical transmission systems.

BACKGROUND OF THE INVENTION

Long distance optical fiber transmission systems, such as those employed in undersea or transcontinental terrestrial lightwave systems that use optical amplifiers, are subject to polarization mode dispersion (PMD) which causes serious signal degradation. PMD is caused by a difference in the group delay for two orthogonal modes of an optical signal propagating in an optical fiber. PMD is especially important in lightwave systems using optical amplifiers because, in such systems, the transmitted optical signal propagates along the entire lightwave system without retiming or regeneration. Over a several thousand kilometer lightwave system, PMD can cause the difference in group delay for the two orthogonal modes to be large enough to cause excessive pulse broadening which results in severe signal degradation.

Unlike other optical parameters, PMD is very sensitive to fiber configuration and environmental changes such as temperature and pressure. For example, a fiber laid in a straight path on a smooth surface has higher PMD than does a fiber which is tightly wound on bobbin. PMD also increases in optical fibers during the cabling process because fibers are cabled in a purposefully relaxed condition where stress and strain on the fibers is minimized. PMD is higher in optical fibers in a relaxed condition because there is less of the mode coupling of the orthogonal modes that results from random localized birefringence as when the fiber has perturbations due to stress or strain.

Although pertubations in optical fibers tend to reduce PMD, other fiber parameters can be adversely affected when the fiber is subjected to a high level of pertubations. For example, perturbations which reduce fiber relaxation and PMD tend to increase fiber loss and decrease fiber strength—a result which is contrary to present lightwave systems design rules. This most probably explains why most fiber optic cables are unsuitable for use in long distance lightwave transmission systems using optical amplifiers where low PMD is desired.

SUMMARY OF THE INVENTION

Improved PMD performance is achieved in fiber optic cable fabricated in accordance with the principles of the invention by twisting each of a plurality of optical fibers in a controlled manner as the cable is being formed. A controlled amount of twist is imparted to each optical fiber uniformly along its entire length. Uniformity of twist reduces twist-induced strain and promotes optimum PMD reduction.

Fiber optic cables fabricated by this method exhibit lower PMD than that measured prior to cabling for the individual constituent fibers. Moreover, the method reduces PMD without concomitant adverse effects on other fiber characteristics observed from prior art PMD reduction methods.

BRIEF DESCRIPTION OF THE DRAWING

In the drawing:

FIG. 4 shows a cross-sectional view of the illustrative fiber optic cable core shown in FIG. 1 taken along section 9, 4 in FIG. 3.

FIG. 5 shows a cross-sectional view of the illustrative fiber optic cable core shown in FIG. 1 taken along section 10, 5 in FIG. 3.

FIG. 6 shows a cross-sectional view of the illustrative fiber optic cable core shown in FIG. 1 taken along section 11, 6 in FIG. 3.

FIG. 7 shows a cross-sectional view of the illustrative fiber optic cable core shown in FIG. 1 taken along section 12, 7 in FIG. 3.

FIG. 8 shows a cross-sectional view of the illustrative fiber optic cable core shown in FIG. 1 taken along section 13, 8 in FIG. 3.

FIG. 9 shows a cross-sectional view of the illustrative fiber optic cable core shown in FIG. 1 having untwisted fibers as in the prior art taken along section 9, 4 in FIG. 3.

FIG. 10 shows a cross-sectional view of the illustrative fiber optic cable core shown in FIG. 1 having untwisted fibers as in the prior art taken along section 10, 5 in FIG. 3.

FIG. 11 shows a cross-sectional view of the illustrative fiber optic cable core shown in FIG. 1 having untwisted fibers as in the prior art taken along section 11, 6 in FIG. 3.

FIG. 12 shows a cross-sectional view of the illustrative fiber optic cable core shown in FIG. 1 having untwisted fibers as in the prior art taken along section 12, 7 in FIG. 3.

FIG. 13 shows a cross-sectional view of the illustrative fiber optic cable core shown in FIG. 1 having untwisted fibers as in the prior art taken along section 13, 8 in FIG. 3.

DETAILED DESCRIPTION

Figure 1:
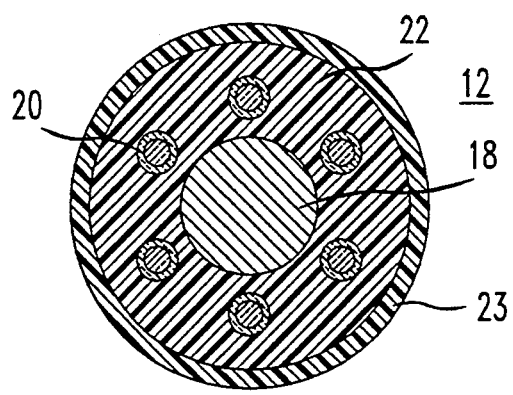
FIG. 1 shows a cross-sectional view of an illustrative embodiment of a communications cable core containing optical fibers arranged for transmission of optical signals fabricated in accordance with the principles of the invention.
Figure 2:
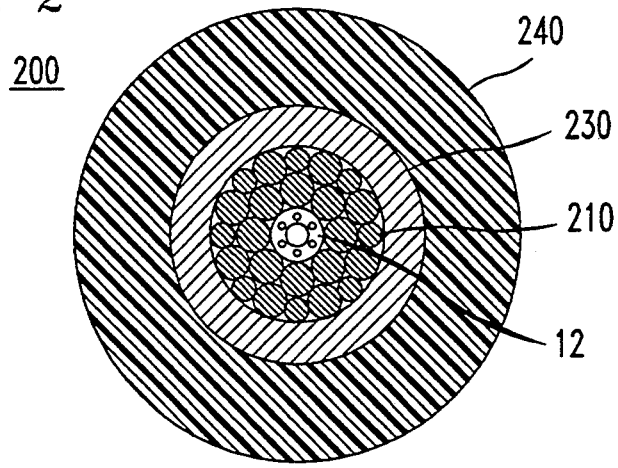
FIG. 2 shows a cross-sectional view of a fiber optic cable containing the illustrative fiber optic cable core shown in FIG. 1.

FIG. 1 shows a cross-sectional view 12 of an illustrative embodiment of a communications cable core containing optical fibers arranged for transmission of optical signals. Cable core 12 is typically processed into a lightwave cable 200 containing the additional elements of steel strength members 210, copper conductors 230, and polymer insulation 240 as shown in FIG. 2. Details of the cable fabrication process are presented in U.S.

Pat. No. 4,484,963 issued Nov. 27, 1984, to Stephen N. Anctil et al.

Cable core 12 includes a central elongated strength member, or kingwire, 18, optical fibers 20 imbedded in a thermoplastic elastomer 22, and a polymer sheath 23 surrounding the elastomer.

A prior art method of cable fabrication is disclosed in U.S. Pat. No. 4,541,970, issued on Sep. 17, 1985, to Lendall L. Caverly etal. (Caverly), which is hereby incorporated by reference. The known method of cable fabrication includes:

(1) heating a central strength member and extruding a first layer of thermoplastic elastomer onto the heated central strength member;

(2) paying out the optical fibers from a plurality of bobbins;

(3) helically laying the optical fibers onto the first layer of thermoplastic elastomer;

(4) passing the central strength member through a helically rotating closing die to apply radially inward forces on the cable core wherein the central strength member is coated with a thermoplastic elastomer layer and is helically wrapped with optical fibers and wherein no force is applied to the fibers tangentially to the thermoplastic elastomer layer; and (5) extruding a second layer of thermoplastic elastomer over the fibers to merge with the first layer of thermoplastic elastomer.

In contrast, the cable fabricated in accordance with the principles of the present invention represents a significant improvement over the prior art in that, during the paying out of optical fibers step in the process described above, each of optical fibers 20 is twisted about its axis parallel to the direction of lightwave propagation in the fiber. As will be described in more detail below, twisting of each optical fiber as it is fabricated into a finished cable significantly decreases PMD in the fibers and the cable.

Figure 3:
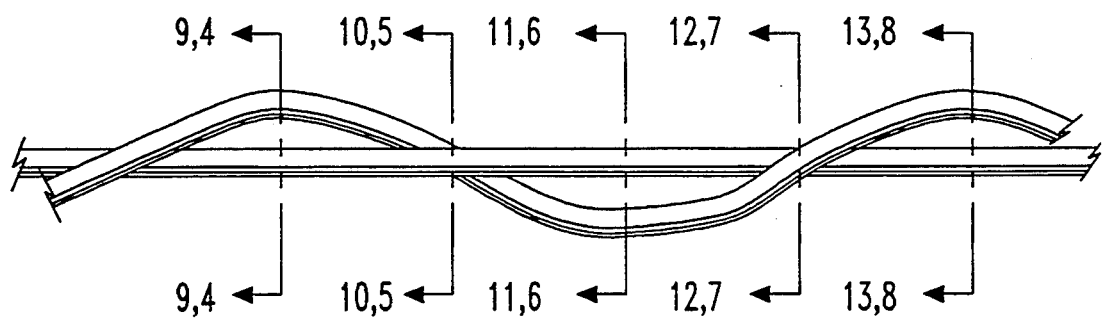
FIG. 3 shows a side-elevation view of an illustrative fiber optic cable core with one out of the plurality of optical fibers shown.

FIGS. 3-13 are helpful in understanding the improvement provided by the present invention. FIG. 3 shows a side-elevation view of the illustrative fiber optic cable core shown in FIG. 1 where the plurality of optical fibers 20 is arranged helically about kingwire 18 such that the distance between full revolutions of each fibers is constant along the entire length of the cable core 12. The distance between full revolutions of each fiber is known as lay length L. For purposes of clarity, only one out of the plurality of fibers 20 is shown in FIGS. 3-13.

FIG. 4 shows a cross-sectional view of the illustrative fiber optic cable core shown in FIG. 1 taken along section 9, 4 in FIG. 3 at some arbitrary location, $L_1$. FIG. 3 defines a reference orientation for optical fibers 20 that is useful in the following discussion. FIG. 5 shows a cross-sectional view of the illustrative fiber optic cable core shown in FIG. 1 taken along section 10, 5 in FIG. 3, where section 10, 5 is located at a distance $L_2 = L/4$ away from location $L_1$. FIG. 6 shows a cross-sectional view of the illustrative fiber optic cable core shown in FIG. 1 taken along section 11, 6 in FIG. 3, where section 11, 6 is located a distance of $L_3 = L/2$ away from location $L_1$. FIG. 7 shows a cross-sectional view of the illustrative fiber optic cable core shown in FIG. 1 taken along section 12, 7 in FIG. 3, where section 12, 7 is located a distance of $L_4 = 3L/4$ away from location $L_1$. FIG. 8 shows a cross-sectional view of the illustrative fiber optic cable core shown in FIG. 1 taken along section 13, 8 in FIG. 3, where section 13, 8 is located a distance of $L_5 = L$ away from location $L_1$.

As shown in FIG. 4, at location $L_1$, fiber 20 is in a reference orientation at the twelve o'clock position with 0° of twist. Reference vector $A_1$ is arbitrarily chosen at location $L_1$ as an indication of the reference orientation of fiber 20. FIG. 5 shows that at location $L_2$, fiber 20 is at the three o'clock position as it has traversed a quarter helical revolution around kingwire 18 while twisting 90° about its axis from its reference orientation as indicated by the position of vector $A_2$. FIG. 6 shows that at location $L_3$, fiber 20 is at the six o'clock position as it has traversed a half helical revolution around kingwire 18 while twisting 180° about its axis from its reference orientation as indicated by the position of vector $A_3$. FIG. 7 shows that at location $L_4$, fiber 20 is at the nine o'clock position as it has traversed three-quarters of a helical revolution about kingwire 18 while twisting 270° about its axis from the reference location as indicated by the position of vector $A_4$. FIG. 8 shows that at location $L_5$, fiber 20 is again at the twelve o'clock position as it has traversed a full helical revolution around kingwire 18 while twisting 360° about its axis from its reference orientation as indicated by the position of vector $A_5$. Thus, with every full helical revolution of fiber 20 about kingwire 18, fiber 20 has twisted 360°.

For purposes of comparison, FIGS. 9-13 show cross-sectional views of prior art cables taken at positions $L_1$, $L_2$... $L_5$, respectively. As indicated by the position of vectors $A_6$, $A_7$... $A_{10}$, fibers in prior art cables are not twisted with each full helical revolution.

Stranders are used in the cabling process to wrap one or more optical fibers around the kingwire. One prior art strander helically wraps optical fibers around the kingwire with planetary motion while the kingwire passes through the center of the strander at a controlled rate and tension. Planetary motion is used to avoid imparting twist to the optical fibers as they are wrapped around the kingwire.

In accordance with an aspect of the invention, by contrast, it is desirable that a controlled amount of twist be imparted to the optical fibers as they are helically wrapped around the kingwire by the strander. Twisting the optical fibers at a rate of between two and four twists per meter gives optimum PMD reduction. Additional twisting does not provide substantially more PMD improvement as an upper limit is reached where PMD is no longer sensitive to additional twisting.

Figure 14:
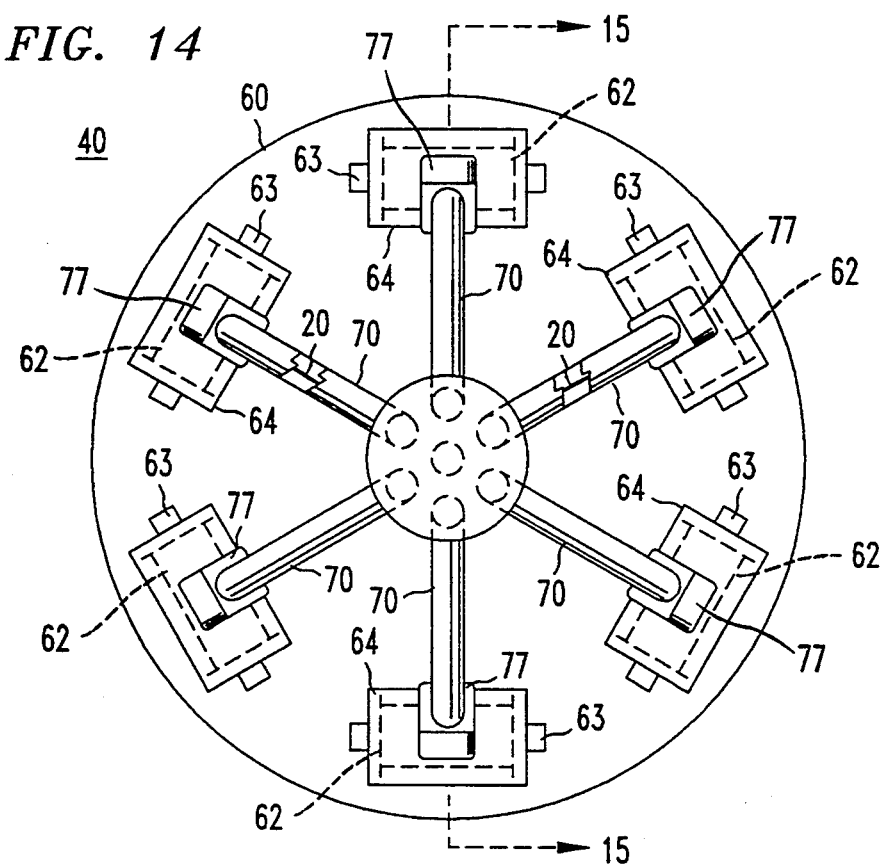
FIG. 14 is front elevation view of an illustrative strander for laying optical fibers incorporating an aspect of the invention.
Figure 15:
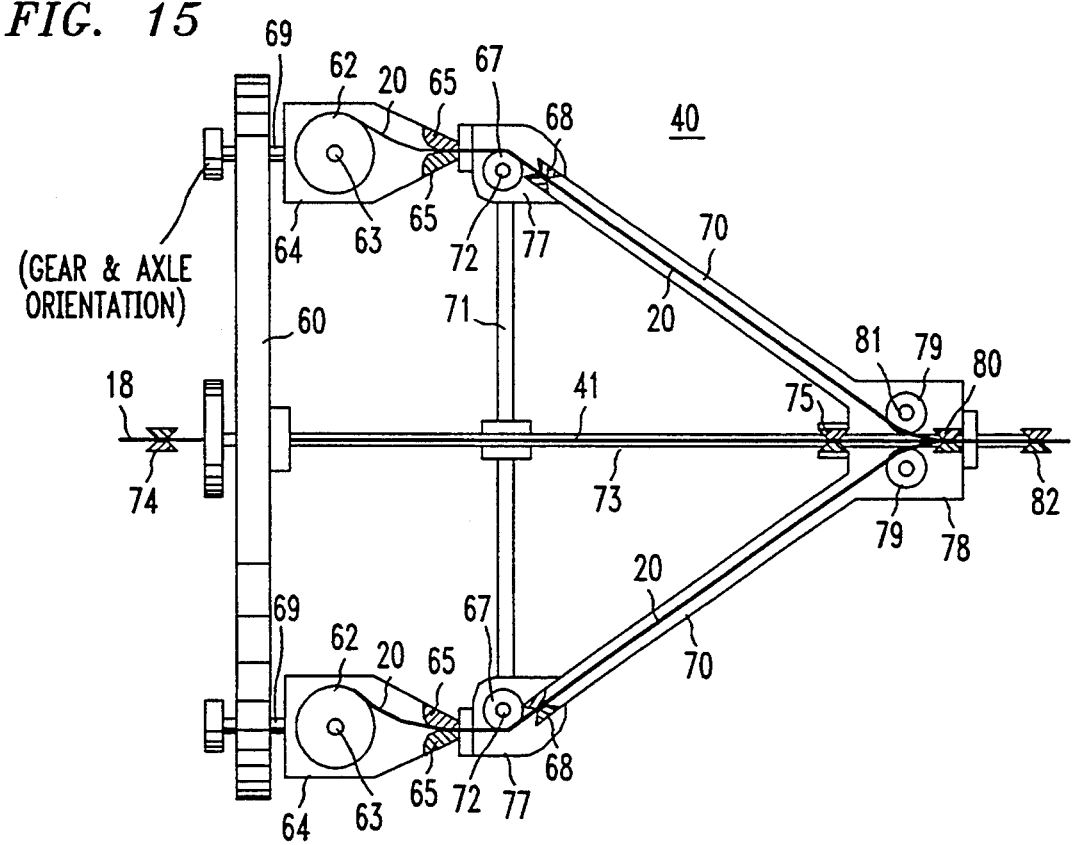
FIG. 15 is a cutaway side view of the illustrative strander shown in FIG. 15 taken along the center line of FIG. 15.

FIG. 14 is front elevation view of an illustrative strander for wrapping optical fibers around the kingwire with a controlled amount of twist. FIG. 15 is a cutaway side view of the illustrative strander shown in FIG. 15 taken along the center line of FIG. 15. Note that elements 65, 67, 68, 70, 71, 72, 77, 79, 80, 81, and 82 in FIG. 15 and the functions employed therein are described in the Caverly reference and are not described in detail herein.

Wheel 60 is designed to rotate about the coated kingwire 18. (The kingwire is coated with thermoplastic material in a manner disclosed by the Caverly reference. Methods and apparatus used to pay out kingwire 18 and wind-up the finished cable are well known in the art and are not discussed in detail herein). Wheel 60 carries one or more bobbins 62, each supplying a continuous length of optical fiber. An axial tube 73 forms the rotating axle for the wheel 60 and the rest of strander 40. The coated kingwire passes through the axial tube 73 from left to right in FIG. 15. An entrance guide 74 and an exit guide 75 hold the coated kingwire at the center axis of the tube 73.

Each bobbin 62 has an axle 63 which is fixed in orientation, for instance, perpendicular to a radial line of wheel 60. Also, every bobbin 62 is separately enclosed by a housing 64 that rotates about coated kingwire 18 with the wheel 60 and the enclosed bobbin. As housing 64 revolves with the wheel 60, it remains fixed in orientation with respect to housing axle 69. Housing axles 69 for all of the housings 64 are parallel with one another and with kingwire 18. Each bobbin 62 stores a length of optical fiber 20 that is payed out for wrapping helically about the first layer of elastomer coating the kingwire. As wheel 60 revolves about kingwire 18, housings 64 stay fixed with respect to wheel 60 in such a manner as to keep bobbin axle 63 fixed in orientation with respect to the strander 40. This motion imparts a twist to each optical fiber 20 at the rate of one twist per revolution of wheel 60. In turn, there is one twist per lay length where the lay length is determined jointly by the revolution speed of wheel 60 and the payout rate of kingwire 18. In some applications of the invention, it may desirable for wheel 60 to be mechanically linked to housing axles 69 through a system of gears such that housings 64 make one full rotation with respect to wheel 60 with each revolution of wheel 60 about kingwire 18.

Advantageously, the amount of twist imparted to the optical fibers can be readily controlled by changing the rate at which wheel 60 revolves about kingwire 18, or, by changing the rate at which kingwire 18 is passed through strander 40 (i.e. the pass-through rate). The following examples are illustrative of how this particular advantage is realized by the invention.

EXAMPLE 1

The pass-through rate of kingwire 18 is constant at 33 meters per minute (m/min). If wheel 60 revolves at a constant 132 revolutions per minute (rev./min.), then lay length L is calculated as follows:

$$L = \frac{33 \frac{m}{min.}}{132 \frac{rev.}{min.}} = 0.25 \text{ m/rev.}$$

Strander 40 imparts twist to the fibers at a rate of one twist per revolution about kingwire 18. Twist rate T which represents the number of twists of optical fibers 20 per unit length of finished cable, is calculated as the inverse of lay length L:

$$T = \frac{132 \frac{twists}{min.}}{33 \frac{m}{min.}} = 4 \text{ twists/m}$$

EXAMPLE 2

The pass-through rate of kingwire 18 is 55 m/min. If wheel 60 revolves at the same 132 revolutions per minute as in example 1, then lay length L and twist rate T are calculated as follows:

$$L = \frac{55 \frac{m}{min.}}{132 \frac{rev.}{min.}} = 0.417 \text{ m/rev.}$$

$$T = \frac{132 \frac{twists}{min.}}{55 \frac{m}{min.}} = 2.4 \text{ twists/m}$$

Thus, at a constant rate of revolution of wheel 60, twist is inversely proportional to the increase in pass-through rate.

Both examples show that the twist of optical fibers 20 can be controlled by changing the pass-through rate at a constant rate of revolution of wheel 60.

EXAMPLE 3

This example shows that the twist of optical fibers 20 can be controlled by varying the rate of revolution of wheel 60 about kingwire 18 while the pass-through rate is held constant. The pass-through rate of kingwire 18 is constant at 33 m/min as in example 1. If wheel 60 revolves at 150 revolutions per minute, then lay length L and twist rate T are calculated as follows:

$$L = \frac{33 \frac{m}{min.}}{150 \frac{rev.}{min.}} = 0.220 \text{ m/rev.}$$

$$T = \frac{150 \frac{twists}{min.}}{33 \frac{m}{min.}} = 4.55 \text{ twists/m}$$

Thus, at a constant pass-through rate, twist increases proportionally to the increase in the rate of revolution of wheel 60. It will be apparent to those skilled in the art that changing the pass-through rate and rate of revolution of wheel 60 simultaneously will also change twist rate T and lay length L accordingly.

It will also be readily apparent to those skilled in the art that the objectives of the present invention may also be advantageously accomplished by imparting other than one twist to fibers 20 per revolution of strander 40 about kingwire 18. The above examples show that lay length L is reduced as twist rate T is increased because strander 40 imparts twist to the fibers at a rate of one twist per revolution of wheel 60 about kingwire 18 when housings 64 are fixed relative to wheel 60. If, however, housings 64 are free to rotate in a direction and rate independent of the revolution of wheel 60, then it is apparent that twist rate T is independent of lay length L. For example, if wheel 60 revolves clockwise, then housings 64 may rotate in the same clockwise direction or in a counterclockwise direction at a different rate than wheel 60. Independence of twist rate T and lay length L may be realized, for example, by changing the rotational relationship between housings 64 and wheel 60 through a change in gearing. Alternatively, it may be desirable to independently rotate housings 64 using a separate drive motor connected to housing axles 69. Coordination of such a drive motor with strander 40 and kingwire 18 provides fiber twist in either direction with any desired twist rate T and lay length L. Advantageously then, it is possible to provide a straight optical fiber payout by setting the revolution rate of wheel 60 to zero to allow for parallel stranding of the fibers within cable core 12 (FIG. 1) without any helical wrapping, but with a controlled amount of twist imparted to the fibers by the independently rotating housings 64 with respect to wheel 60.

As mentioned above, it is desirable to twist each optical fiber as it is fabricated into a finished cable to significantly decrease PMD in the fibers. In cables fabricated in accordance with the principles of the invention, PMD has been found to decrease almost linearly with twist rate T, when twist rate T is small (approximately two twists per meter). As the twist rate increases, smaller PMD reductions are realized until a limit is reached (i.e. where PMD is no longer sensitive to additional twists). In cables fabricated using a twist rate T between two and four twists per meter, PMD in typical commercially available dispersion optical fibers has been reduced by a factor of three to four as compared to PMD for cables fabricated with a twist rate T of zero. Using a twist rate T greater than four twists per meter is not desirable because bending losses and strength reduction in the fibers resulting from such a twist rate are not balanced by a commensurate benefit from the additional PMD benefit realized from the extra twisting.

The invention advantageously provides for uniform twisting of fibers 20 (FIG. 1) in that twist rate T is constant over the entire length of fibers 20. As described earlier, a second layer of thermoplastic is immediately extruded over the helically laid and twisted fibers during the cabling fabrication process. This second layer of thermoplastic merges with the first layer of thermoplastic coating kingwire 18 which permanently fixes the twisted fibers to the thermoplastic material to prevent the fibers from untwisting. It will be appreciated by those skilled in the art that of the entire length of the fiber is twisted at the optimum twist rate, then optimum PMD reduction is advantageously realized.

Another advantage of the invention is that the PMD variation as a function of the wavelength of the transmitted signal on the lightwave system is reduced in cables having twisted fibers. In some wavelength ranges, PMD of cables with untwisted fibers vary by more than 300% over a 5 nanometer wavelength change, while PMD variations of cables with twisted fibers are very small—only a few percent.

The reduction in PMD variation is important because the transmitter wavelength in a transmission system may have to be adjusted after system installation or during system operation. In cables having untwisted fibers, this wavelength adjustment may cause a large change in PMD which results in system performance degradation. However, in cables having twisted fibers, the PMD variation resulting from the wavelength adjustment is advantageously small. Cables having twisted fibers also provide the advantage of having reduced PMD sensitivity to environmental changes, including temperature and pressure.

The foregoing merely illustrates the principles of the present invention. Although an illustrative embodiment employing a planetary strander with fixed and variable rotational speed bobbin housings is disclosed, such a method has only been used herein in an exemplary manner. Therefore, the scope of the invention is not limited to the use of such stranders. The principles of the present invention may also be applied to other methods and apparatus for fabricating fiber optic cables. It will be appreciated that those skilled in the art will be able to devise numerous and various alternative arrangements which, although not explicitly shown or described herein, embody the principles of the invention and are within its spirit and scope.

We claim:

1. A method for fabricating an optical fiber cable, comprising the steps of:
   providing a plurality of fiber optic supply bobbins;
   paying out a plurality of optical fibers from said plurality of supply bobbins;
   imparting a controlled amount of twist to each of said optical fibers so that each fiber retains said controlled amount of twist in said optical fiber cable; and
   subjecting said optical fibers to a cabling process;
   wherein said step of imparting includes twisting each of said plurality of optical fibers uniformly along its entire length
   and said twisting occurs at a rate between two and four twists per meter of optical fiber.

2. A method for fabricating an optical fiber cable comprising the steps of:
   heating a central strength member;
   extruding a first layer of thermoplastic material onto said heated central strength member;
   providing a plurality of fiber optic supply bobbins;
   paying out a plurality of optical fibers from said plurality of supply bobbins;
   imparting a controlled amount of twist to said optical fibers;
   laying out said plurality of optical fibers on[o said first layer of thermoplastic material; and
   extruding a second layer of thermoplastic material over said plurality of optical fibers to merge with said first layer of thermoplastic material so that each fiber retains the controlled amount of twist in said optical fiber cable.

3. The method of claim 2 wherein said step of laying out includes helically wrapping said plurality of optical fibers onto said first layer of thermoplastic material.

4. The method of claim 2 wherein said step of imparting includes twisting each of said plurality of optical fibers uniformly along its entire length.

5. The method of claim 4 wherein said twisting occurs at a rate between two and four twists per meter of optical fiber.

6. The method of claim 3 wherein said twisting occurs at a rate between two and four twists per meter of optical fiber.

7. A method for fabricating an optical fiber cable comprising the steps of:
   heating a central strength member;
   extruding a first layer of thermoplastic material onto said heated central strength member;
   providing a plurality of fiber optic supply bobbins;
   paying out a plurality of optical fibers from said plurality of supply bobbins;
   imparting a controlled amount of twist to said optical fibers so that each fiber is twisted about an axis parallel to a direction of lightwave propagation in said optical fiber;
   laying out said plurality of optical fibers onto said first layer of thermoplastic material; and
   extruding a second layer of thermoplastic material over said plurality of optical fibers to merge with said first layer of thermoplastic material so that each fiber retains said controlled amount of twist in said optical fiber cable.

8. The method of claim 7 wherein said step of laying out includes helically wrapping each of said plurality of optical fibers onto said first layer of thermoplastic material.

9. The method of claim 7 wherein said step of imparting includes twisting each of said plurality of optical fibers uniformly along its entire length 10. The method of claim 8 wherein said twisting occurs at a rate between two and four twists per meter of optical fiber.

11. The method of claim 9 wherein said twisting occurs at rate between two and four twists per meter of optical fiber.

12. An optical fiber cable having one or more optical fibers twisted in accordance with the method of claim 7.

* * * * *